(12) United States Patent
Cromer et al.

(10) Patent No.: US 6,701,349 B1
(45) Date of Patent: Mar. 2, 2004

(54) DATA PROCESSING SYSTEM AND METHOD FOR PROHIBITING UNAUTHORIZED MODIFICATION OF TRANSMISSION PRIORITY LEVELS

(75) Inventors: Daryl Carvis Cromer, Apex, NC (US); Brandon Jon Ellison, Raleigh, NC (US); Eric Richard Kern, Durham, NC (US); Howard Jeffery Locker, Cary, NC (US); Andy Lloyd Trotter, Raleigh, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/356,190

(22) Filed: Jul. 16, 1999

(51) Int. Cl.$^7$ .............................................. G06F 13/00
(52) U.S. Cl. ..................... 709/207; 709/218; 709/219; 709/235; 709/238; 709/240; 370/231; 370/389; 370/394; 370/400; 713/201
(58) Field of Search ................. 709/207, 200; 370/400, 389

(56) References Cited

U.S. PATENT DOCUMENTS

| | | | | |
|---|---|---|---|---|
| 5,935,248 A | * | 8/1999 | Kuroda ........................ | 713/201 |
| 5,940,390 A | * | 8/1999 | Berl et al. ................... | 370/389 |
| 5,991,302 A | * | 11/1999 | Berl et al. ................... | 370/389 |
| 6,084,879 A | * | 7/2000 | Berl et al. ................... | 370/389 |
| 6,108,583 A | * | 8/2000 | Schneck et al. ............... | 700/67 |
| 6,115,751 A | * | 9/2000 | Tam et al. .................... | 709/224 |
| 6,125,110 A | * | 9/2000 | Proctor et al. ............... | 370/331 |
| 6,167,445 A | * | 12/2000 | Gai et al. .................... | 709/220 |
| 6,188,670 B1 | * | 2/2001 | Lackman et al. ........... | 370/231 |
| 6,263,444 B1 | * | 7/2001 | Fujita ......................... | 380/255 |

* cited by examiner

*Primary Examiner*—Ayaz Sheikh
*Assistant Examiner*—Syed A. Zia
(74) *Attorney, Agent, or Firm*—Bracewell & Patterson LLP; Martin McKinley

(57) ABSTRACT

A data processing system and method are disclosed for prohibiting an unauthorized user from modifying a priority level associated with a client computer system. The priority level is utilized by a client computer system during transmission of the client's data over a network. One of a plurality of priority levels is associated with the client computer system. The plurality of priority levels includes a higher priority level and a lower priority level. The client computer system associates the priority level with the data transmitted by the client computer system over the network. The data associated with the higher priority level is typically transmitted prior to data associated with the lower priority level. In response to an attempt to modify the associated priority level, the client determines whether the attempt is being made by an approved user. In response to a determination that the attempt is not being made by an approved user, the attempted modification of the priority level is prohibited. In another embodiment, a priority level may be associated with each class of data. When the client computer system transmits a packet, the client determines which class of data is included in the packet. The priority level associated with that class is then associated with the packet including that class of data. The client, then, transmits the packet which is associated with one of the priority levels.

23 Claims, 5 Drawing Sheets

DATA PROCESSING SYSTEM AND METHOD FOR PROHIBITING UNAUTHORIZED MODIFICATION OF TRANSMISSION PRIORITY LEVELS

BACKGROUND OF THE INVENTION

1. Field of the Invention

The present invention relates in general to data processing systems and, in particular, to a data processing system and method for prohibiting unauthorized modification of transmission priority levels. Still more particularly, the present invention relates to a data processing system and method for prohibiting unauthorized users from modifying transmission priority levels associated with data transmitted over a network.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

Types of data transmitted over a network, such as an Ethernet network, include video conference, network phone, multi-cast applications, control packets, ordinary data, and as well as other types. The IEEE standards, 802.1p, 802.1q, and 801.v, now provide a method for identifying data packets according to their data classification.

Some classes of data are more time sensitive during transmission than others. For example, video and audio data must be received at a particular rate in order to have a synchronized presentation. Failure to receive video or audio data in a timely manner results in missed data which affects the smoothness of the presentation.

Therefore a need exists for a data processing system and method for prioritizing data packets transmitted over a network and for prohibiting unauthorized users from modifying the established priorities.

SUMMARY OF THE INVENTION

A data processing system and method are disclosed for prohibiting an unauthorized user from modifying a priority level associated with a client computer system. The priority level is utilized by a client computer system during transmission of the client's data over a network. One of a plurality of priority levels is associated with the client computer system. The plurality of priority levels includes a higher priority level and a lower priority level. The client computer system associates the priority level with the data transmitted by the client computer system over the network. The data associated with the higher priority level is typically transmitted prior to data associated with the lower priority level. In response to an attempt to modify the associated priority level, the client determines whether the attempt is being made by an approved user. In response to a determination that the attempt is not being made by an approved user, the attempted modification of the priority level is prohibited.

In another embodiment, a priority level may be associated with each class of data. When the client computer system transmits a packet, the client determines which class of data is included in the packet. The priority level associated with that class is then associated with the packet including that class of data. The client, then, transmits the packet which is associated with one of the priority levels.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

The present invention is a method and system for prohibiting an unauthorized user from modifying one of a plurality of priority levels associated with and stored within a client computer system. The priority level is utilized by the client during the transmission of data by the client over a network. One of the plurality of priority levels may also be associated with each class of data transmitted over the network, such that some classes of data are transmitted at a higher priority level than other classes.

A server computer system coupled to the client utilizing a network establishes a plurality of priority levels, and associates a priority level either with the client computer system or with each class of data capable of being transmitted by the client. The server transmits the established priority level(s) to the client along with an identifier which uniquely identifies the server. The client then stores the received priority level(s) in protected storage along with the identifier. Subsequently, when an attempted modification is received, the identifier transmitted with the attempted modification is compared to the stored identifier. If the received identifier matches the stored identifier, the client will update its stored priority information. If the received identifier does not match the stored identifier, the client will not update its stored priority information.

Encryption algorithms are known to ensure that only the intended recipient of a message can read and access the message. One known encryption algorithm is an asymmetric, or public key, algorithm. The public key algorithm is a method for encrypting messages sent from a first computer system to a second computer system. This algorithm provides for a key pair including a public key and a private key for each participant in a secure communication. This key pair is unique to each participant. An example of such an encryption scheme is an RSA key pair system.

In accordance with the present invention, once the server has established a priority level for a client, or a priority level for each class of data, this priority information is signed by the server utilizing the server's private key. This signature is the identifier the server transmits to the client. When the client receives the signed priority information, the client will attempt to decrypt the signature utilizing the server's public key. If the client is able to decrypt the priority information utilizing the server's public key, the client is assured that the server, and no other system, transmitted the priority information. Therefore, the client will permit its stored priority information to be updated.

Figure 1:
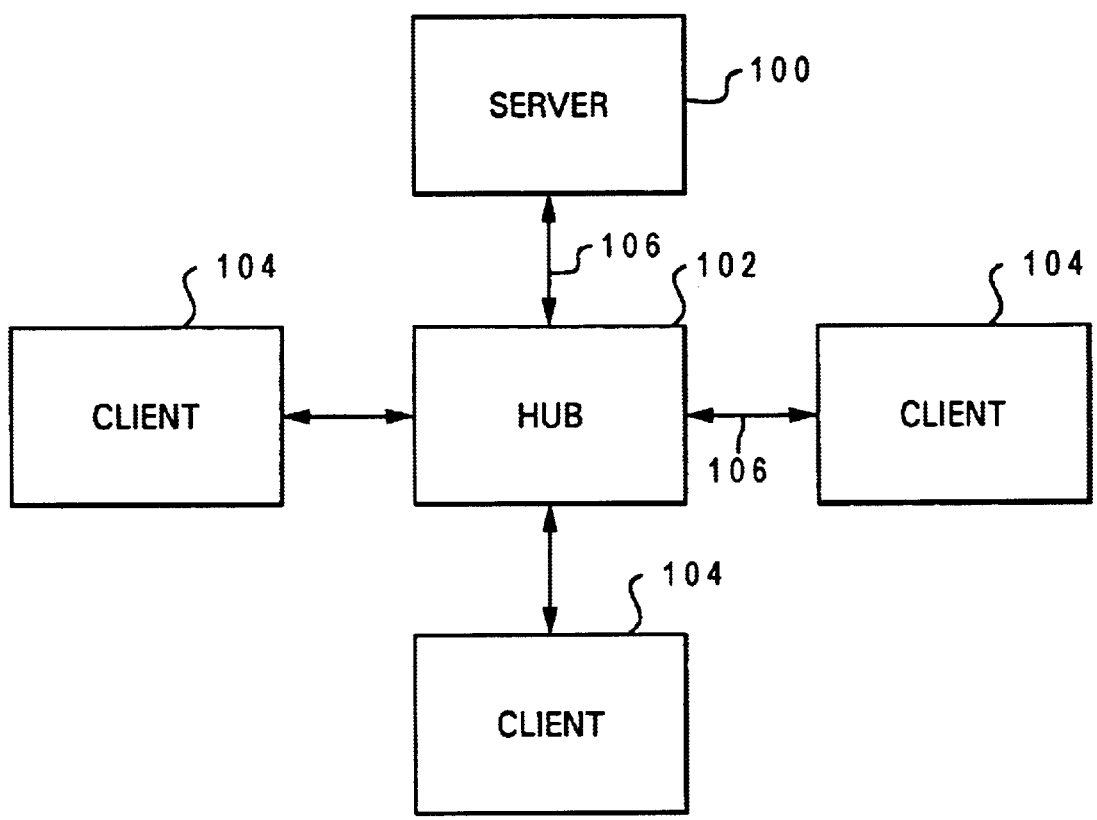
FIG. 1 illustrates a pictorial representation of a data processing system network including a server computer system and a plurality of client computer systems coupled to a network in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 and client computer systems 104 are connected to hub 102 utilizing a communication link 106. Communications link 106 may conform to a local area network standard such as the Ethernet specification, or may be a wide area network (WAN) utilizing a telephone network. Those skilled in the art will recognize that the invention described herein may be implemented utilizing any suitable type of data communications channel or link. In addition, communications link 106 may simultaneously include multiple different types of data communications channels.

Figure 2:
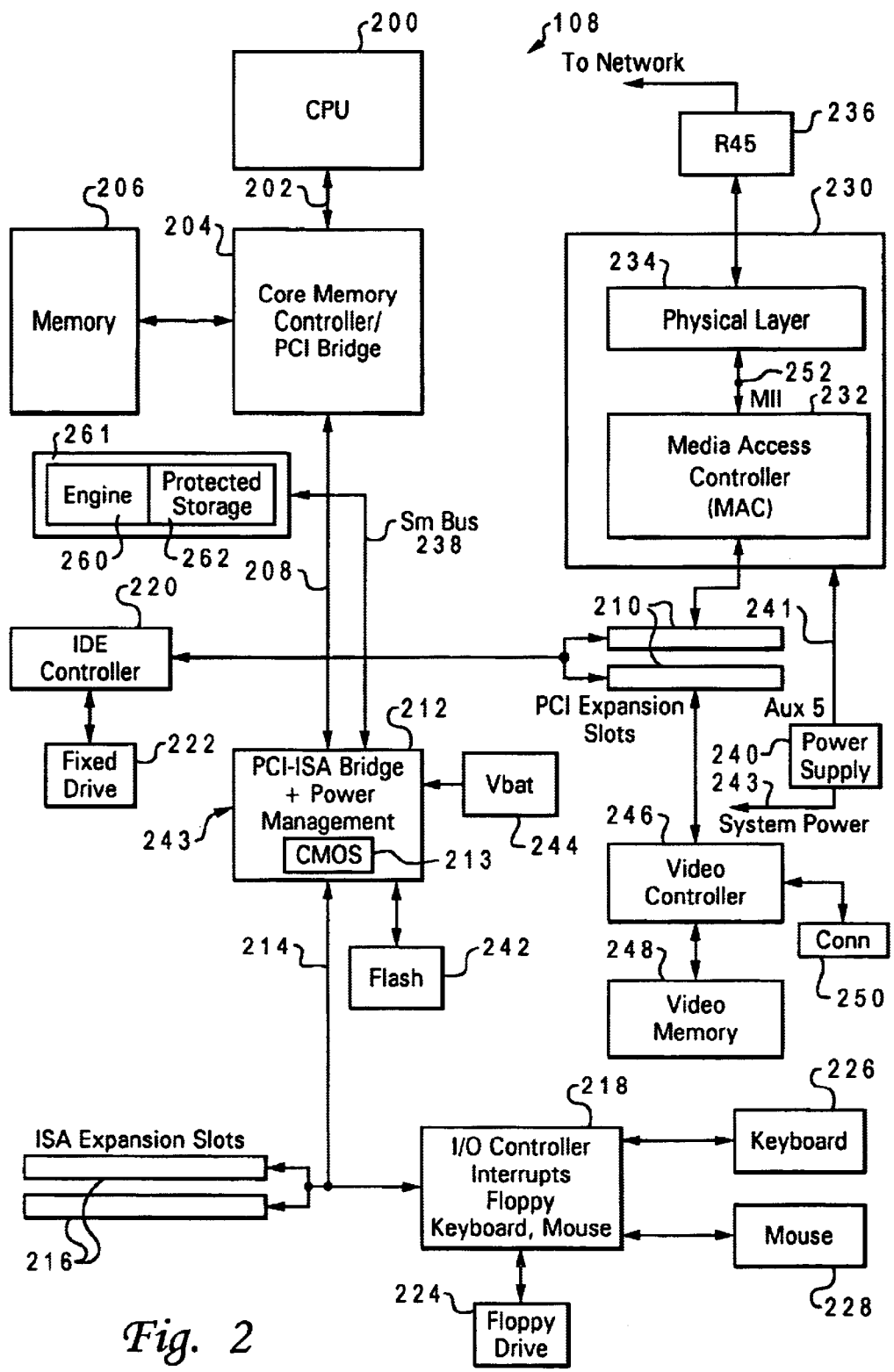
FIG. 2 depicts a more detailed pictorial representation of a client computer system in accordance with the method and system of the present invention.

FIG. 2 depicts a more detailed pictorial representation of a computer system 108 which may be utilized to implement a client computer system of FIG. 1 in accordance with the method and system of the present invention. Computer 108 includes a planar (also commonly called a motherboard or system board) which is mounted within computer 108 and provides a means for mounting and electrically interconnecting various components of computer 108 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 204 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer 108 includes a video controller 246 which may, for example, be plugged into one of PCI expansion slots 210. Video controller 246 is connected to video memory 248. The image in video memory 248 is read by controller 246 and displayed on a monitor (not shown) which is connected to computer 108 through connector 250.

Computer system 108 includes a power supply 240 which supplies full normal system power 243, and has an auxiliary power main AUX 5 241 which supplies full time power to the power management logic 212, and to a network adapter 230.

Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234. Network adapter 230 may be plugged into one of the PCI connector slots 210 (as illustrated) or one of the ISA connector slots 216 in order to permit computer system 108 to communicating with server 100 utilizing communications link 106.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of computer system 108. Second, it advertises its own capabilities to server computer 100. Third, it establishes a connection with server computer 100 using the highest performance connection technology.

In accordance with the present invention, the planar includes an encryption device 261 which includes an encryption/decryption engine 260 which includes an encryption/decryption algorithm which is utilized to encode and decode messages transmitted and received by the planar, and protected storage 262. Engine 260 can preferably perform public\private key encryption. Engine 260 may access a protected storage device 262. Protected storage device 262 is accessible only through engine 260. Priority information stored within storage 262 is protected by engine 260 and is not accessible to the planar or its components except through engine 260. Device 262 may be implemented utilizing an electronically erasable storage device, such as an EEPROM.

Encryption device 261, including engine 260 and EEPROM 262, is coupled to PCI-ISA bridge 212 utilizing a system management (SM) bus 238. System management bus 238 is a two-wire, low speed, serial bus used to interconnect management and monitoring devices. Those skilled in the art will recognize that encryption device 261 may be coupled to another bus within the planar.

Figure 3:
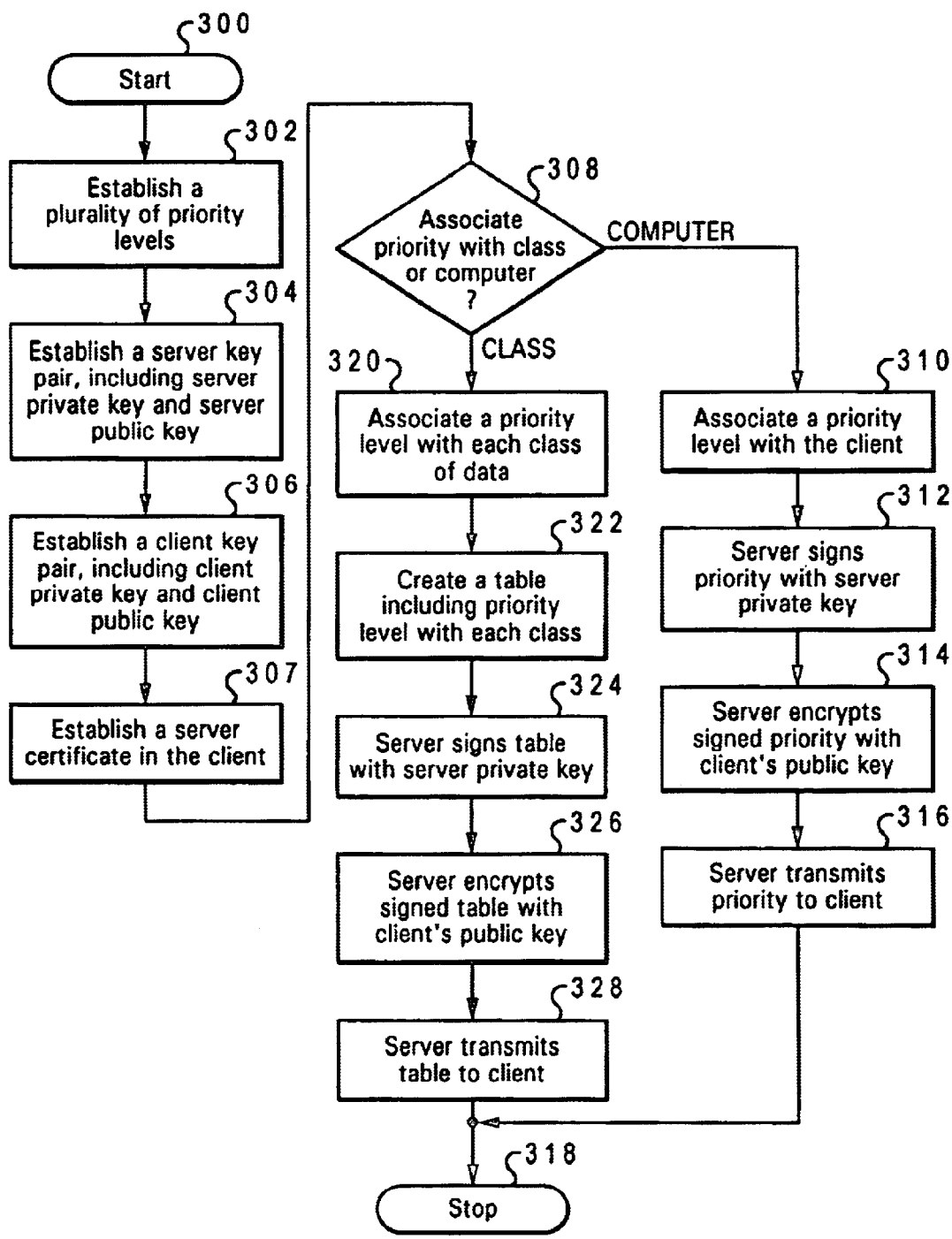
FIG. 3 illustrates a high level flow chart which depicts a server computer system associating a priority level with a particular computer or class of data for a client computer system in accordance with the method and system of the present invention.

FIG. 3 illustrates a high level flow chart which depicts a server computer system associating a priority level with a particular computer or class of data for a client computer system in accordance with the method and system of the present invention. The process starts as depicted at block 300 and thereafter passes to block 302 which depicts establishing a plurality of priority levels. Next, block 304 illustrates establishing a server key pair including a server public key and a server private key. Thereafter, block 306 depicts establishing a client key pair including a client public key and a client private key. Block 307, then, illustrates establishing a server certificate in the client. A certificate is issued by a trusted third party and associates a system with its public/private key pair.

The process then passes to block 308 which illustrates a determination of whether or not one of the priority levels is to be associated with either a particular computer or with a class of data. If a determination is made that one of the priority levels is to be associated with a particular computer, the process passes to block 310 which depicts associating one of the priority levels with a particular client computer system. When a priority level is associated with a client, the priority level will be utilized for all network data transmissions from the client. Therefore, the priority level will be inserted into the header for all network traffic transmissions.

The process then passes to block 312 which illustrates the server signing the associated priority level by encrypting the priority level utilizing the server's private key. Next, block 314 depicts the server encrypting the signed priority level utilizing the client's public key. Thereafter, block 316 illustrates the server transmitting the encrypted, signed priority to the client computer system. The process then terminates as illustrated at block 318.

Referring again to block 308, if a determination is made that one of the priority levels is to be associated with a particular class of data, the process passes to block 320 which depicts associating one of the priority levels with each class of data capable of being transmitted by the client computer system. For each message transmitted by the client, the class of data included within the message will be determined. The priority level associated with that class of data will be inserted into the header for the message.

The process then passes to block 322 which illustrates the server creating a table including the priority level associated with each class of data. Next, block 324 depicts the server signing the table by encrypting the table utilizing the server's private key. Next, block 326 depicts the server encrypting the signed table utilizing the client's public key. Thereafter, block 328 illustrates the server transmitting the encrypted, signed table to the client computer system. The process then terminates as illustrated at block 318.

Figure 4:
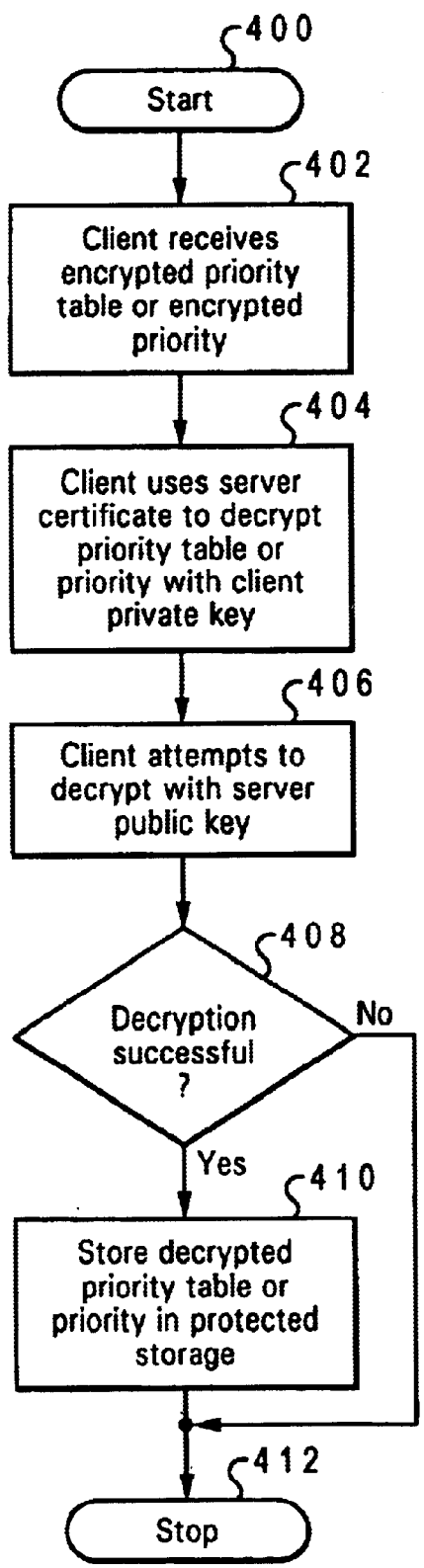
FIG. 4 depicts a high level flow chart which illustrates a client determining whether to permit an attempted modification of a priority level or table of priorities in accordance with the method and system of the present invention.

FIG. 4 depicts a high level flow chart which illustrates a client determining whether to permit an attempted modification of a priority level or table of priorities in accordance with the method and system of the present invention. The process starts as illustrated at block 400 and thereafter passes to block 402 which depicts the client computer system receiving an encrypted priority table or encrypted priority level. Next, block 404 illustrates the client decrypting the table or level utilizing the client's private key which is obtained from the client's certificate. Thereafter, block 406 depicts the client attempting to decrypt the decrypted table or level using the server's public key. The process then passes to block 408 which illustrates a determination of whether or not the client was able to decrypt the decrypted table or level using the server's public key. If a determination is made that the client was able to decrypt the decrypted table or level, the client has determined that the server did sign the table or level and the process passes to block 410. Block 410 depicts the client storing the fully decrypted table or level in protected storage in the client. In this manner, a modification has been permitted by the client because the client was able to verify that the approved user, the known server computer system, was the system attempting to make a modification. Referring again to block 408, if a determination is made that the client was unable to decrypt the decrypted table or level using the server's public key, the process terminates at block 412 because the client has determined that an unapproved user was attempting to modify the stored priority level or table.

Figure 5:
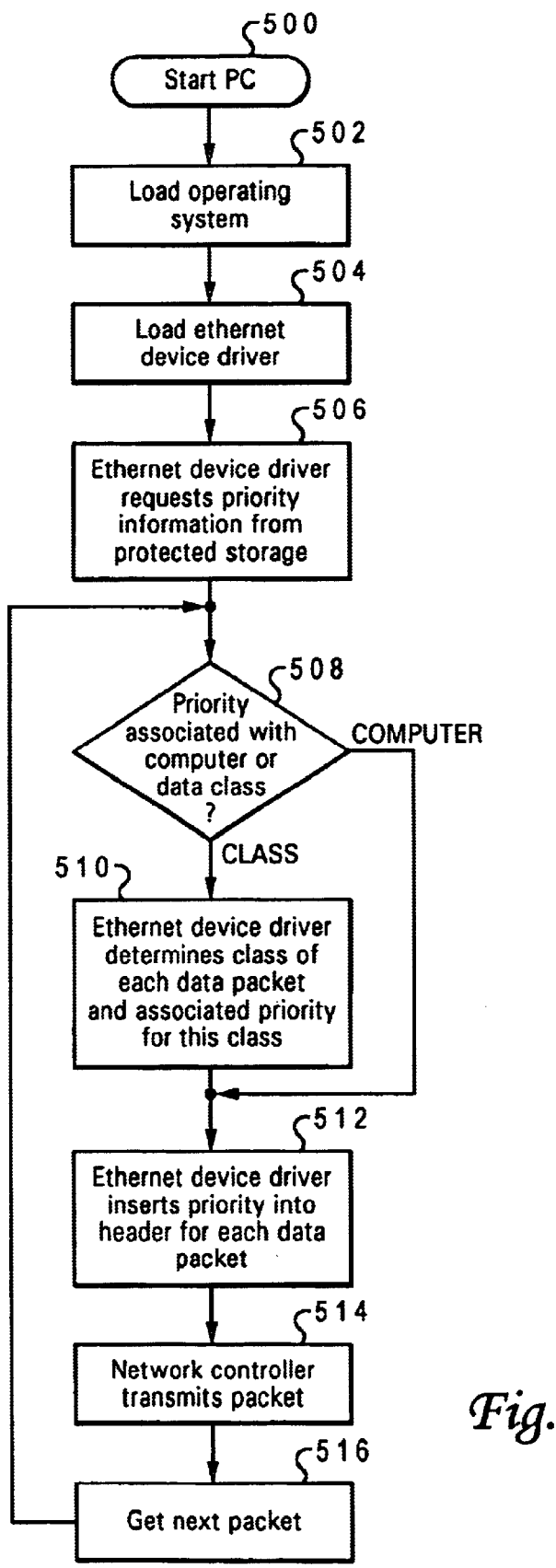
FIG. 5 depicts a high level flow chart which illustrates a client computer system transmitting data associated with a stored priority level in accordance with the method and system of the present invention.

FIG. 5 depicts a high level flow chart which illustrates a client computer system transmitting data associated with a stored priority level in accordance with the method and system of the present invention. The process starts as illustrated at block 500 which depicts starting the operation of a client computer system. Next, block 502 illustrates the client loading its operating system. Thereafter, block 504 depicts the client computer system loading a network driver, such as an Ethernet driver. The process then passes to block 506 which illustrates the network device driver requesting priority information from protected storage. Next, block 508 depicts a determination of whether or not the retrieved priority information is associated with the client computer system or with a particular class of data. If a determination is made that the priority information is associated with the client, the process passes to block 512.

Referring again to block 508, if a determination is made that the priority information is associated with a particular class of data, the process passes to block 510 which illustrates the network driver determining the data class for the data included in a network packet to be transmitted, and the priority level associated with that class. Thereafter, block 512 depicts the network driver inserting the determined priority level into the header for this packet. Next, block 514 illustrates the network controller transmitting the packet. Block 516 then depicts getting the next packet to be transmitted. The process thereafter passes back to block 508.

While a preferred embodiment has been particularly shown and described, it will be understood by those skilled in the art that various changes in form and detail may be made therein without departing from the spirit and scope of the present invention.

What is claimed is:

1. A method in a client computer system for prohibiting an unauthorized user from modifying a priority level associated with said client computer system, said priority level utilized by said client computer system during transmission of data over a network, said method comprising the steps of:
   - associating one of a plurality of priority levels with said client computer system, said plurality of priority levels including a higher priority level and a lower priority level;
   - said client computer system associating said one of said plurality of priority levels with data transmitted by said client computer system over said network, wherein data associated with said higher priority level is transmitted prior to data associated with said lower priority level;
   - in response to an attempt to modify said one of said plurality of priority levels, determining whether said attempt is being made by an approved user; and
   - in response to a determination that said attempt is not being made by an approved user, prohibiting said attempted modification of said one of said plurality of priority levels.

2. The method according to claim 1, wherein said step of associating one of a plurality of priority levels further comprises the steps of:
   - a server computer system coupled to said network determining said one of said plurality of priority levels to associate with said client computer system; and
   - said server computer system transmitting said determined one of said plurality of priority levels to said client computer system utilizing said network.

3. The method according to claim 2, further comprising the step of prior to said server computer system transmitting said determined one of said plurality of priority levels to said client computer system, said server computer system associating an identifier with said one of said plurality of priority levels, said identifier uniquely identifying said server computer system.

4. The method according to claim 3, further comprising the step of in response to said client computer system receiving said one of said plurality of priority levels and said associated unique identifier, said client computer system storing said one of said plurality of priority levels and said associated unique identifier in protected storage within said client computer system.

5. The method according to claim 4, wherein said step of in response to an attempt to modify said one of said plurality of priority levels, determining whether said attempt is being made by an approved user further comprises the steps of:
   - receiving an attempted modification of said one of said plurality of priority levels, said attempted modification including an identifier which identifies a user attempting said modification;
   - said client computer system comparing said identifier included with said attempted modification with said identifier which identifies said server computer system; and
   - in response to said identifier included with said attempted modification being unequal to said identifier which identifies said server computer system, said client computer system prohibiting said user from modifying said one of said plurality of priority levels.

6. The method according to claim 5, further comprising the step of in response to said identifier included with said attempted modification being equal to said identifier which identifies said server computer system, permitting said user to modify said one of said plurality of priority levels.

7. The method according to claim 6, wherein said step of in response to an attempt to modify said one of said plurality of priority levels, determining whether said attempt is being made by an approved user further comprises the step of said server computer system signing said one of said plurality of priority levels by creating a signature, wherein said signature is said identifier which identifies said server computer system attempting said modification.

8. The method according to claim 7, further comprising the steps of:
   - establishing a server encryption key pair for said server computer system, said server encryption key pair including a server private key and a server public key; and
   - said server computer system creating said signature by encrypting said one of said plurality of priority levels utilizing said server encryption key pair.

9. The method according to claim 8, wherein said step of said server computer system creating said signature by encrypting said one of said plurality of priority levels utilizing said server encryption key pair further comprises the step of said server computer system creating said signature by encrypting said one of said plurality of priority levels utilizing said server private key.

10. The method according to claim 9, wherein the step of said client computer system determining whether said identifier included with said attempted modification is equal to said identifier which identifies said server computer system further comprises the steps of:
    - said client computer system attempting to decrypt said identifier included with said attempted modification utilizing said server public key; and
    - in response to said client computer system being able to decrypt said identifier included with said attempted modification utilizing said server public key, determining that said identifier included with said attempted modification is equal to said identifier which identifies said server computer system.

11. The method according to claim 10, further comprising the steps of:
    - associating one of a plurality of priority levels with each of a plurality of classes of data capable of being transmitted by said client computer system, wherein some of said plurality of classes of data are associated with said higher priority level and others of said plurality of classes of data are associated with said lower priority level;
    - for each packet to be transmitted by said client computer system, said client computer system determining one of said plurality of classes of data included within said packet;
    - associating said one of said plurality of priority levels associated with said determined one of said plurality of classes of data with said packet to be transmitted by said client computer system; and said client computer system transmitting a message including a plurality of packets, some of said plurality of packets being associated with said higher priority level and others of said plurality of packets being associated with said lower priority level.

12. A system in a client computer system for prohibiting an unauthorized user from modifying a priority level associated with said client computer system, said priority level utilized by said client computer system during transmission of data over a network, comprising:

said system executing code for associating one of a plurality of priority levels with said client computer system, said plurality of priority levels including a higher priority level and a lower priority level;

said client computer system executing code for associating said one of said plurality of priority levels with data transmitted by said client computer system over said network, wherein data associated with said higher priority level is transmitted prior to data associated with said lower priority level;

in response to an attempt to modify said one of said plurality of priority levels, said client computer system executing code for determining whether said attempt is being made by an approved user; and in response to a determination that said attempt is not being made by an approved user, said client computer system executing code for prohibiting said attempted modification of said one of said plurality of priority levels.

13. The system according to claim 12, wherein said system executing code for associating one of a plurality of priority levels further comprises:

a server computer system coupled to said network for determining said one of said plurality of priority levels to associate with said client computer system; and said server computer system capable of transmitting said determined one of said plurality of priority levels to said client computer system utilizing said network.

14. The system according to claim 13, further comprising prior to said server computer system transmitting said determined one of said plurality of priority levels to said client computer system, said server computer system executing code for associating an identifier with said one of said plurality of priority levels, said identifier uniquely identifying said server computer system.

15. The system according to claim 14, further comprising in response to said client computer system receiving said one of said plurality of priority levels and said associated unique identifier, said client computer system executing code for storing said one of said plurality of priority levels and said associated unique identifier in protected storage within said client computer system.

16. The system according to claim 15, wherein said in response to an attempt to modify said one of said plurality of priority levels, said client computer system executing code for determining whether said attempt is being made by an approved user further comprises:

said client computer system executing code for receiving an attempted modification of said one of said plurality of priority levels, said attempted modification including an identifier which identifies a user attempting said modification;

said client computer system executing code for comparing said identifier included with said attempted modification with said identifier which identifies said server computer system; and in response to said identifier included with said attempted modification being unequal to said identifier which identifies said server computer system, said client computer system executing code for prohibiting said user from modifying said one of said plurality of priority levels.

17. The system according to claim 16, further comprising in response to said identifier included with said attempted modification being equal to said identifier which identifies said server computer system, said client computer system executing code for permitting said user to modify said one of said plurality of priority levels.

18. The system according to claim 17, wherein said in response to an attempt to modify said one of said plurality of priority levels, said client computer system executing code for determining whether said attempt is being made by an approved user further comprises said server computer system executing code for signing said one of said plurality of priority levels by creating a signature, wherein said signature is said identifier which identifies said server computer system attempting said modification.

19. The system according to claim 18, further comprising:

said system executing code for establishing a server encryption key pair for said server computer system, said server encryption key pair including a server private key and a server public key; and said server computer system executing code for creating said signature by encrypting said one of said plurality of priority levels utilizing said server encryption key pair.

20. The system according to claim 19, wherein said server computer system executing code for creating said signature by encrypting said one of said plurality of priority levels utilizing said server encryption key pair further comprises said server computer system executing code for creating said signature by encrypting said one of said plurality of priority levels utilizing said server private key.

21. The system according to claim 20, wherein said client computer system executing code for determining whether said identifier included with said attempted modification is equal to said identifier which identifies said server computer system further comprises:

said client computer system executing code for attempting to decrypt said identifier included with said attempted modification utilizing said server public key; and in response to said client computer system being able to decrypt said identifier included with said attempted modification utilizing said server public key, said client computer system executing code for determining that said identifier included with said attempted modification is equal to said identifier which identifies said server computer system.

22. The system according to claim 21, further comprising:

said server computer system executing code for associating one of a plurality of priority levels with each of a plurality of classes of data capable of being transmitted by said client computer system;

for each message to be transmitted by said client computer system, said client computer system executing code for determining one of said plurality of classes of data included within said message; and said client computer system executing code for associating said one of said plurality of priority levels associated with said determined one of said plurality of classes of data with said message to be transmitted by said client computer system.

23. A system for prohibiting an unauthorized user of a client computer system from modifying a priority level associated with said client computer system, said priority level utilized by said client computer system during transmission of data over a network, comprising:

said system executing code for associating one of a plurality of priority levels with said client computer system, said plurality of priority levels including a higher priority level and a lower priority level;

said client computer system executing code for associating said one of said plurality of priority levels with data transmitted by said client computer system over said network, wherein data associated with said higher priority level is transmitted prior to data associated with said lower priority level;

in response to an attempt to modify said one of said plurality of priority levels, said client computer system executing code for determining whether said attempt is being made by an approved user;

in response to a determination that said attempt is not being made by an approved user, said client computer system executing code for prohibiting said modification of said one of said plurality of priority levels;

a server computer system coupled to said network for determining said one of said plurality of priority levels to associate with said client computer system;

said server computer system capable of transmitting said determined one of said plurality of priority levels to said client computer system utilizing said network;

prior to said server computer system transmitting said determined one of said plurality of priority levels to said client computer system, said server computer system executing code for associating an identifier with said one of said plurality of priority levels, said identifier uniquely identifying said server computer system;

in response to said client computer system receiving said one of said plurality of priority levels and said associated unique identifier, said client computer system executing code for storing said one of said plurality of priority levels and said associated unique identifier in protected storage within said client computer system;

wherein said in response to an attempt to modify said one of said plurality of priority levels, said client computer system executing code for determining whether said attempt is being made by an approved user further comprises:

said client computer system executing code for receiving an attempted modification of said one of said plurality of priority levels, said attempted modification including an identifier which identifies a user attempting said modification;

said client computer system executing code for comparing said identifier included with said attempted modification with said identifier which identifies said server computer system;

in response to said identifier included with said attempted modification being unequal to said identifier which identifies said server computer system, said client computer system executing code for prohibiting said user from modifying said one of said plurality of priority levels;

in response to said identifier included with said attempted modification being equal to said identifier which identifies said server computer system, said client computer system executing code for permitting said user to modify said one of said plurality of priority levels;

wherein said in response to an attempt to modify said one of said plurality of priority levels, said client computer system executing code for determining whether said attempt is being made by an approved user further comprises said server computer system executing code for signing said one of said plurality of priority levels by creating a signature, wherein said signature is said identifier which identifies said server computer system attempting said modification;

said system executing code for establishing a server encryption key pair for said server computer system, said server encryption key pair including a server private key and a server public key;

said server computer system executing code for creating said signature by encrypting said one of said plurality of priority levels utilizing said server encryption key pair;

wherein said server computer system executing code for creating said signature by encrypting said one of said plurality of priority levels utilizing said server encryption key pair further comprises said server computer system executing code for creating said signature by encrypting said one of said plurality of priority levels utilizing said server private key;

wherein said client computer system executing code for determining whether said identifier included with said attempted modification is equal to said identifier which identifies said server computer system further comprises:

said client computer system executing code for attempting to decrypt said identifier included with said attempted modification utilizing said server public key;

in response to said client computer system being able to decrypt said identifier included with said attempted modification utilizing said server public key, said client computer system executing code for determining that said identifier included with said attempted modification is equal to said identifier which identifies said server computer system;

said server computer system executing code for associating one of a plurality of priority levels with each of a plurality of classes of data capable of being transmitted by said client computer system;

for each message to be transmitted by said client computer system, said client computer system executing code for determining one of said plurality of classes of data included within said message; and said client computer system executing code for associating said one of said plurality of priority levels associated with said determined one of said plurality of classes of data with said message to be transmitted by said client computer system.

* * * * *